US010086449B2

United States Patent
Liao

(10) Patent No.: US 10,086,449 B2
(45) Date of Patent: *Oct. 2, 2018

(54) APPARATUS FOR FIXING KNIFE PLATE OF SAW MACHINE

(71) Applicant: Hui-Lan Liao, Taichung (TW)

(72) Inventor: Hui-Lan Liao, Taichung (TW)

( * ) Notice: Subject to any disclaimer, the term of this patent is extended or adjusted under 35 U.S.C. 154(b) by 29 days.

This patent is subject to a terminal disclaimer.

(21) Appl. No.: 15/393,395

(22) Filed: Dec. 29, 2016

(65) Prior Publication Data

US 2017/0106456 A1    Apr. 20, 2017

Related U.S. Application Data

(62) Division of application No. 12/785,645, filed on May 24, 2010, now Pat. No. 9,616,509.

(30) Foreign Application Priority Data

Sep. 10, 2009 (CN) .................... 2009 2 0169518 U

(51) Int. Cl.
*B27G 19/08* (2006.01)
*B23D 45/06* (2006.01)
*B27B 5/29* (2006.01)
*B27G 19/02* (2006.01)

(52) U.S. Cl.
CPC ............. *B23D 45/065* (2013.01); *B27B 5/29* (2013.01); *B27G 19/02* (2013.01); *B27G 19/08* (2013.01); *Y10T 83/2077* (2015.04); *Y10T 83/9464* (2015.04)

(58) Field of Classification Search
CPC .... B23D 45/06; B23D 45/065; B23D 45/066; B23D 45/067; B23D 47/025; B23D 47/04; B27B 3/20; B27B 5/29; B27G 19/02; B27G 19/08; B27G 19/10; Y10T 83/2077; Y10T 83/773; Y10T 83/9464; Y10T 83/9469; Y10T 83/9471
USPC ...... 83/102.1, 477.2, 698.41, 698.51, 698.61
See application file for complete search history.

(56) References Cited

U.S. PATENT DOCUMENTS

| 2,719,547 | A |   | 10/1955 | Gjerde |
| 4,599,927 | A |   | 7/1986 | Eccardt et al. |
| 4,962,685 | A |   | 10/1990 | Hagstrom |
| 7,546,791 | B2 |   | 6/2009 | Liu et al. |
| 8,127,648 | B2 |   | 3/2012 | Arvey |
| 9,616,509 | B2 | * | 4/2017 | Liao ..................... B23D 45/065 |

(Continued)

FOREIGN PATENT DOCUMENTS

CN            200942442 Y        9/2007

*Primary Examiner* — Clark F Dexter
(74) *Attorney, Agent, or Firm* — Alan D. Kamrath; Kamrath IP Lawfirm, P.A.

(57) ABSTRACT

An apparatus for fixing a saw blade and a knife plate of a saw grinding machine includes a driving device including an axis; and a fixture plate having a first end and a second end. The fixture plate includes a connective hole coupled to the driving device, and a coupled portion defined at the first end thereof. The saw blade is pivotally connected to the axis of the driving device, with the saw blade and the fixture plate moved with respect to the driving device simultaneously. The knife plate is coupled to the coupled portion of the fixture plate and includes a blocked side formed on a side thereof, with a vertical distance between the blocked side and the saw blade maintained to be fixed.

3 Claims, 10 Drawing Sheets

(56) References Cited

U.S. PATENT DOCUMENTS

| | | |
|---|---|---|
| 2006/0032355 A1 | 2/2006 | Wang |
| 2007/0074612 A1 | 4/2007 | Yu |
| 2007/0074613 A1 | 4/2007 | Yu |
| 2007/0227327 A1 | 10/2007 | Liu et al. |
| 2008/0223189 A1 | 9/2008 | Tanaka |
| 2009/0158906 A1 | 6/2009 | Shibata |
| 2009/0266213 A1 | 10/2009 | Liu et al. |
| 2010/0024620 A1 | 2/2010 | Arvey |

\* cited by examiner

APPARATUS FOR FIXING KNIFE PLATE OF SAW MACHINE

The present application is a division of prior U.S. patent application Ser. No. 12/785,645, filed on May 24, 2010, entitled "Apparatus for Fixing Knife Plate of Saw Machine", now U.S. Pat. No. 9,616,509. The prior U.S. patent application claims priority of China Patent Application Ser. No. 200920169518.2, filed on Sep. 10, 2009, the entirety of which is incorporated herein by reference.

BACKGROUND OF THE INVENTION

1. Field of the Invention

The present invention relates to an apparatus for fixing a saw blade and a knife plate of a saw grinding machine and, more particularly, to an apparatus adapted for fixing a saw blade and a knife plate of a saw grinding machine and able to move simultaneously with the saw blade and the knife plate.

2. Description of the Related Art

Disclosed in China Patent Publication No. 200620120829.6 is a quick-release structure for a splitting unit of a saw grinding machine. The quick-release structure includes a split plate, a fixture base, a hexagonal bolt and a quick-release handle. A front end of the handle includes an engaged portion wedged to an engaged end of the hexagonal bolt. A screw is inserted through the engaged portion of the handle and engages with a screw hole of the hexagonal bolt to couple the handle to the engaged end of the hexagonal bolt.

The split plate is fixed to a groove of the fixture base and detachable from the fixture base by operating the quick-release structure. However, while a saw blade of the saw grinding machine is moved with respect to the saw grinding machine, a vertical distance between the saw blade and the spilt plate can not be maintained to be fixed, because the split plate is fixed. Hence, wood sheet materials cannot be split accurately.

SUMMARY OF THE INVENTION

Accordingly, the object is achieved by providing an apparatus for fixing a saw blade and a knife plate of a saw grinding machine, with the apparatus comprising a driving device and a fixture plate.

The knife plate and the saw blade can be moved with the fixture plate simultaneously to maintain a vertical distance between the knife plate and the saw to be fixed. Therefore, the knife plate can split wood accurately. The knife plate includes a coupled portion having a thickness to firmly couple with two projections formed on a coupled portion of the fixture plate.

Other advantages and features of the present invention will become apparent from the following descriptions referring to the drawings.

BRIEF DESCRIPTION OF THE DRAWINGS

The present invention will be described through detailed illustration of three embodiments referring to the drawings.

DETAILED DESCRIPTION OF THE PREFERRED EMBODIMENTS

Figure 1:
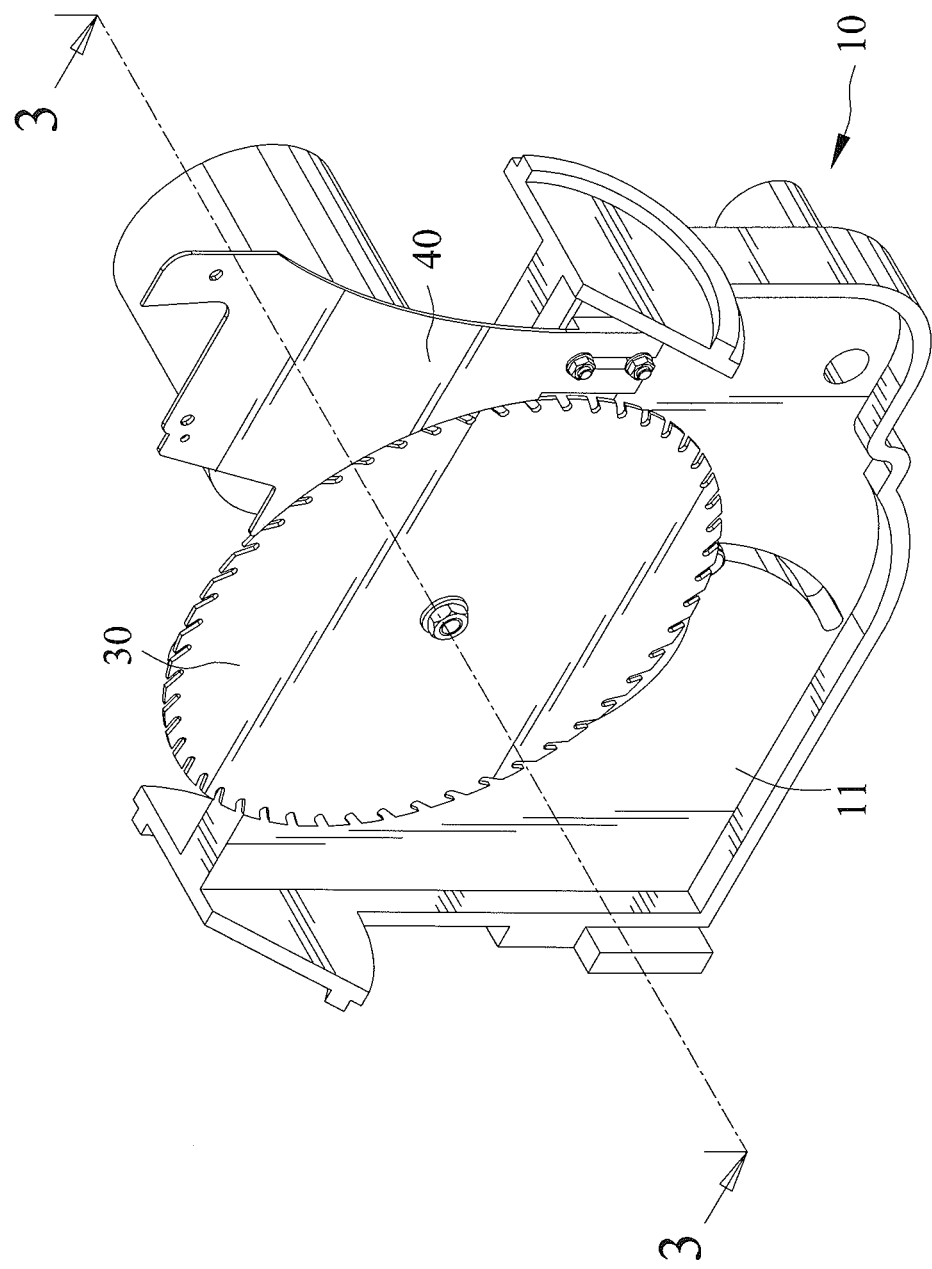
FIG. 1 is a perspective view of an apparatus for fixing a saw blade and a knife plate of a saw grinding machine according to the preferred embodiment of the present invention.
Figure 2:
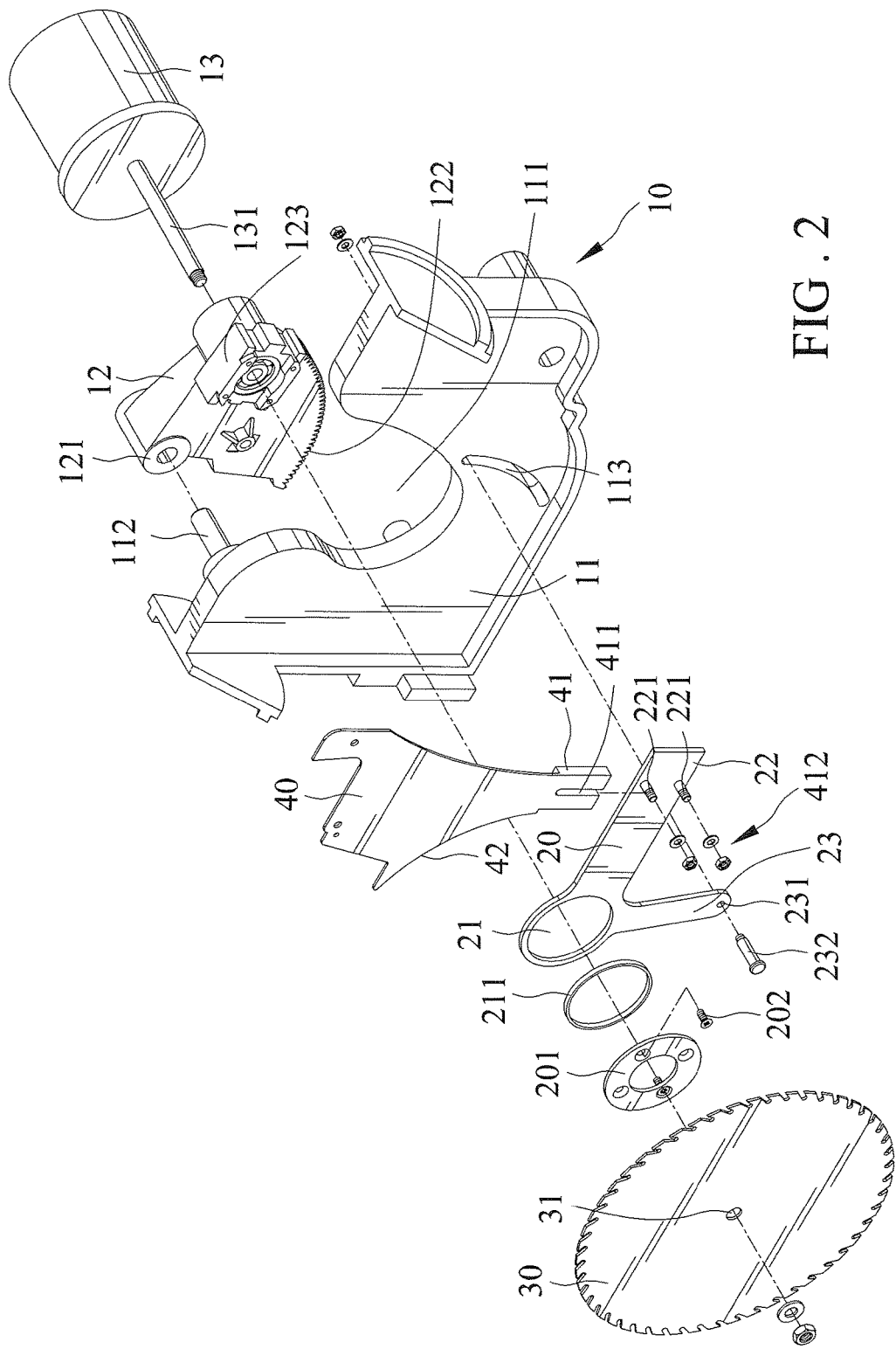
FIG. 2 is an exploded view of the apparatus shown in FIG. 1.
Figure 3:
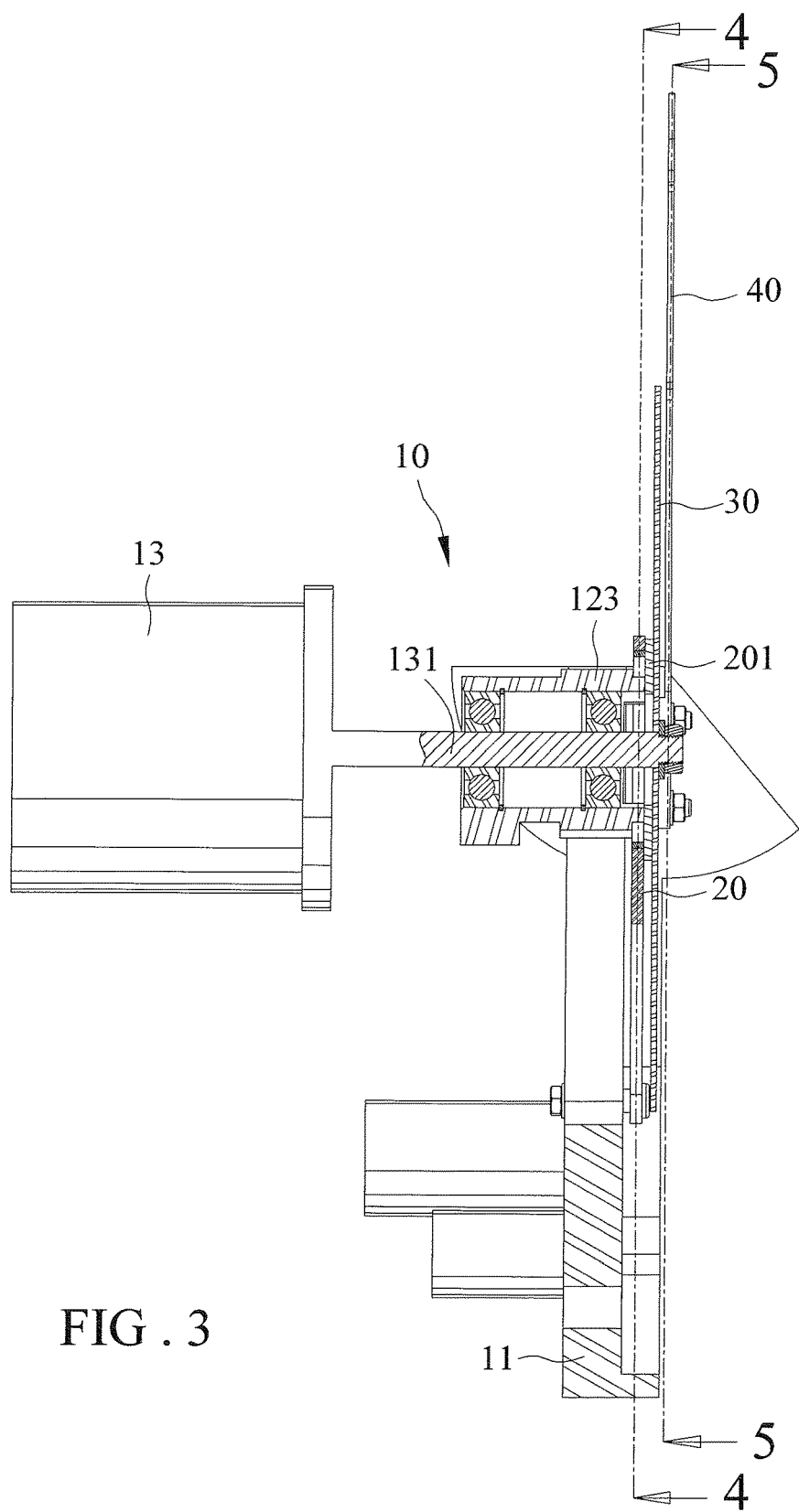
FIG. 3 is a cross-sectional view taken along 3-3 in FIG. 1.
Figure 4:
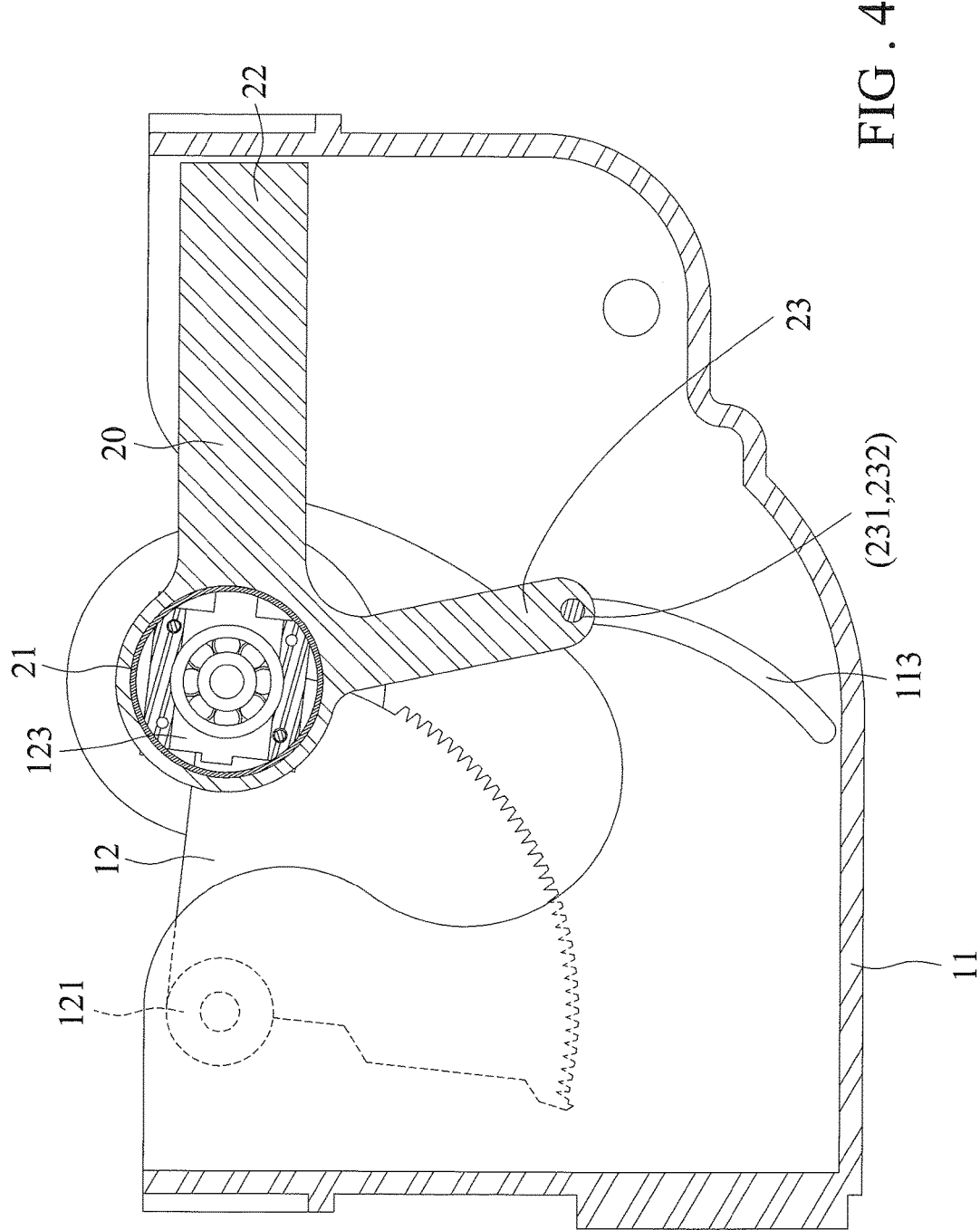
FIG. 4 is a cross-sectional view taken along 4-4 in FIG. 3.
Figure 5:
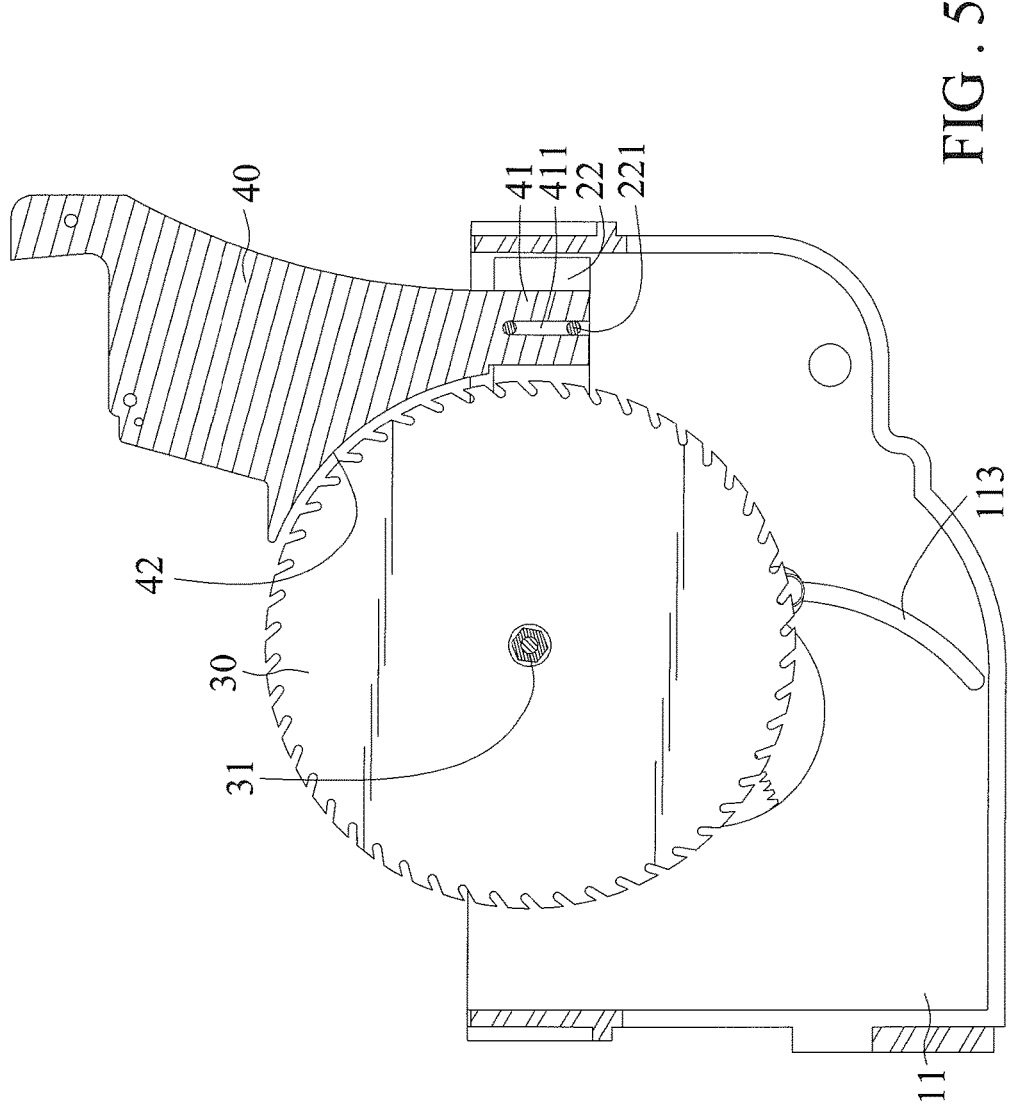
FIG. 5 is a cross-sectional view taken along 5-5 in FIG. 3.
Figure 6:
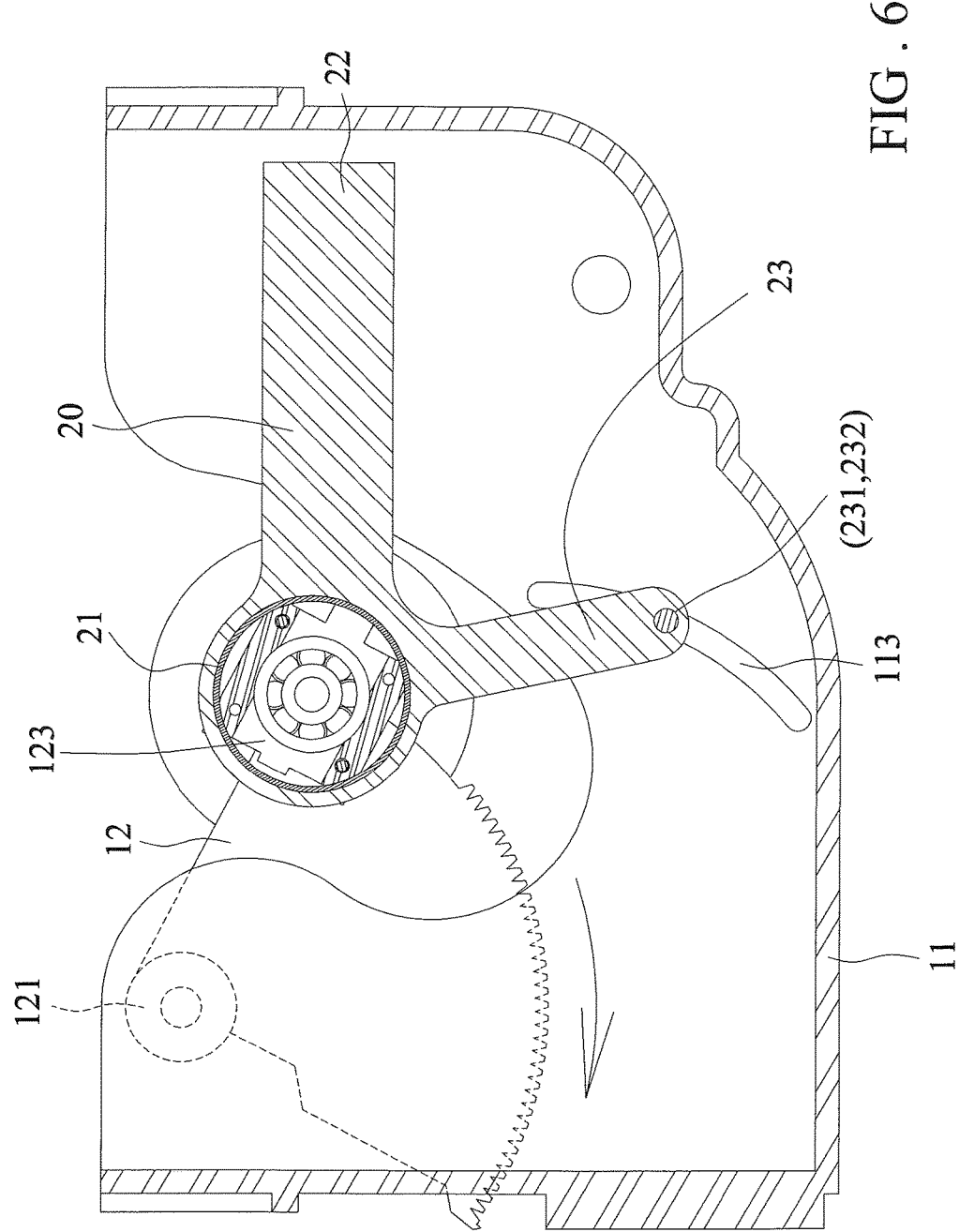
FIG. 6 is a cross-sectional view similar to FIG. 4, illustrating the guiding portion moved along the adjustment trough.
Figure 7:
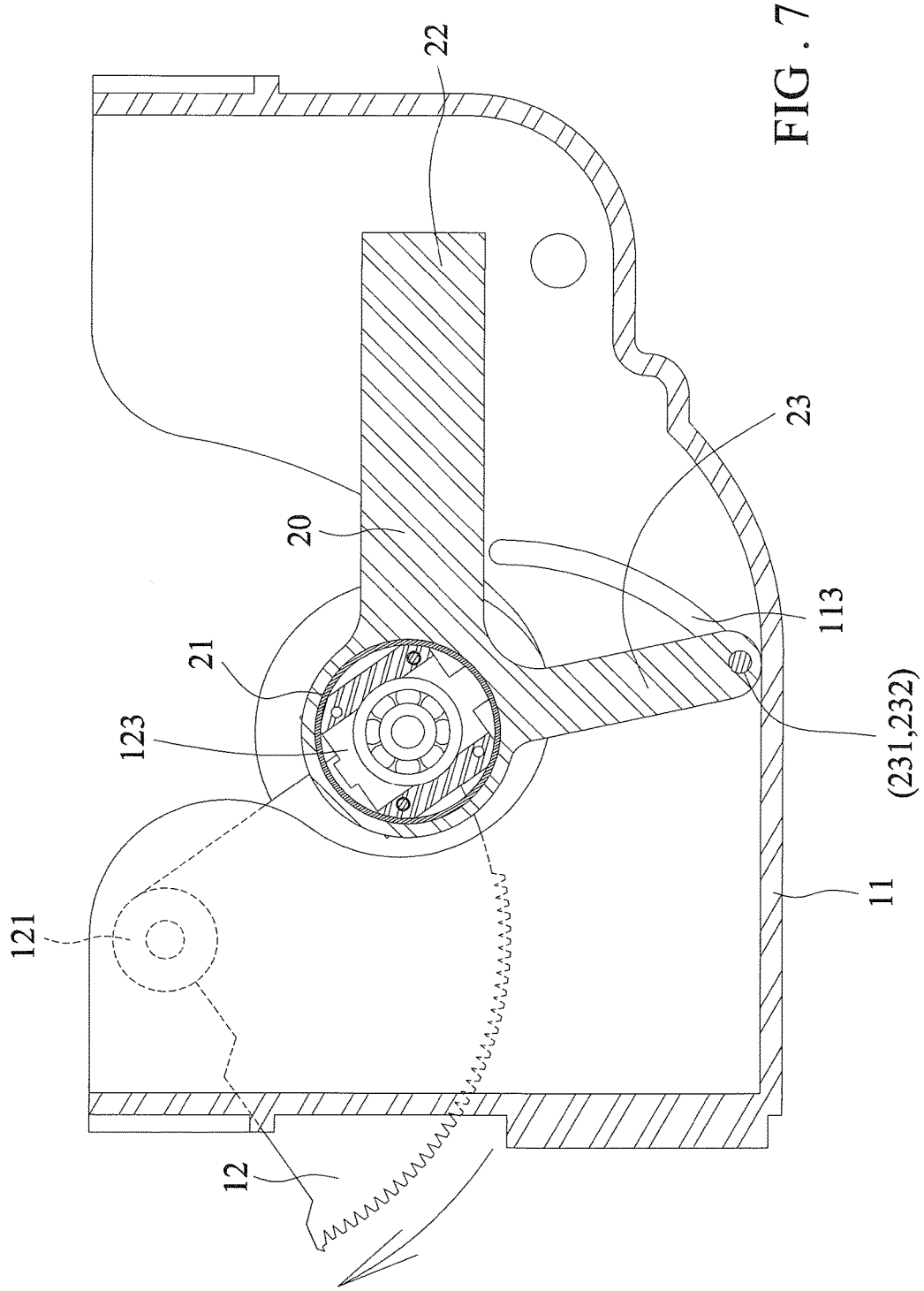
FIG. 7 is a cross-sectional view similar to FIG. 6, illustrating the guiding portion is moved to the bottom of the adjustment trough.
Figure 8:
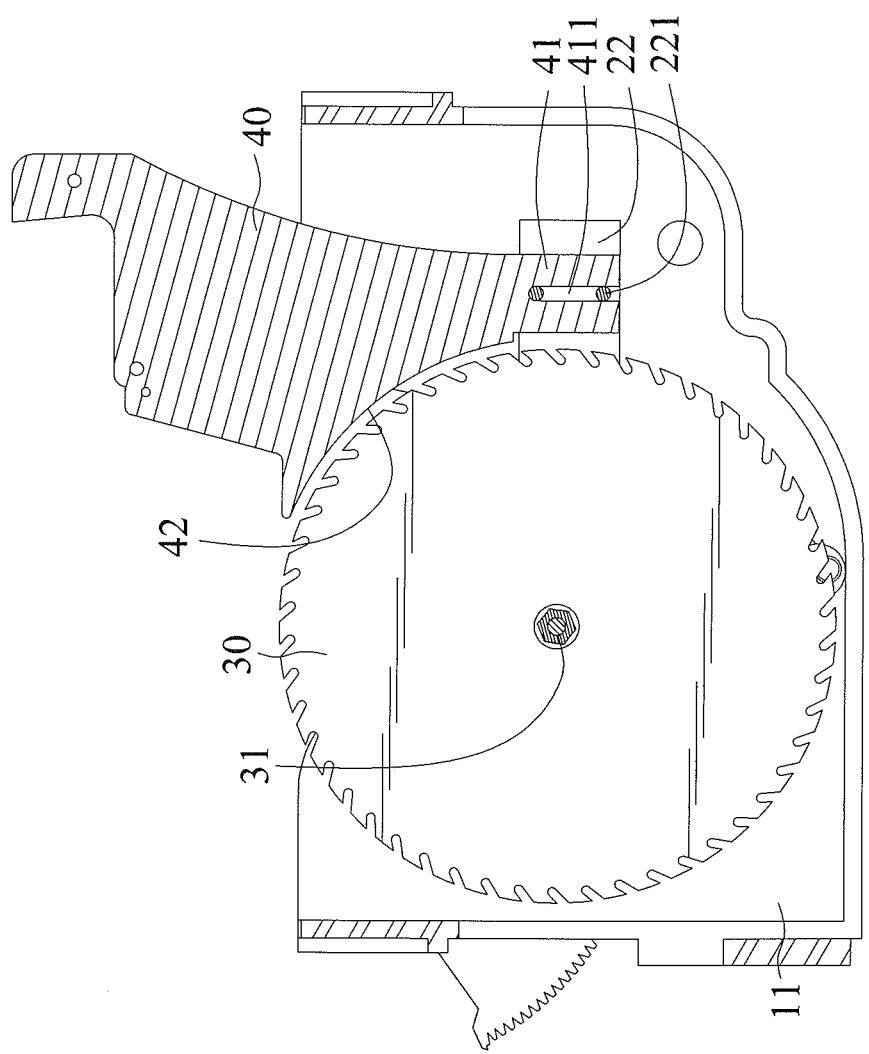
FIG. 8 is another cross-sectional view similar to FIG. 7.
Figure 9:
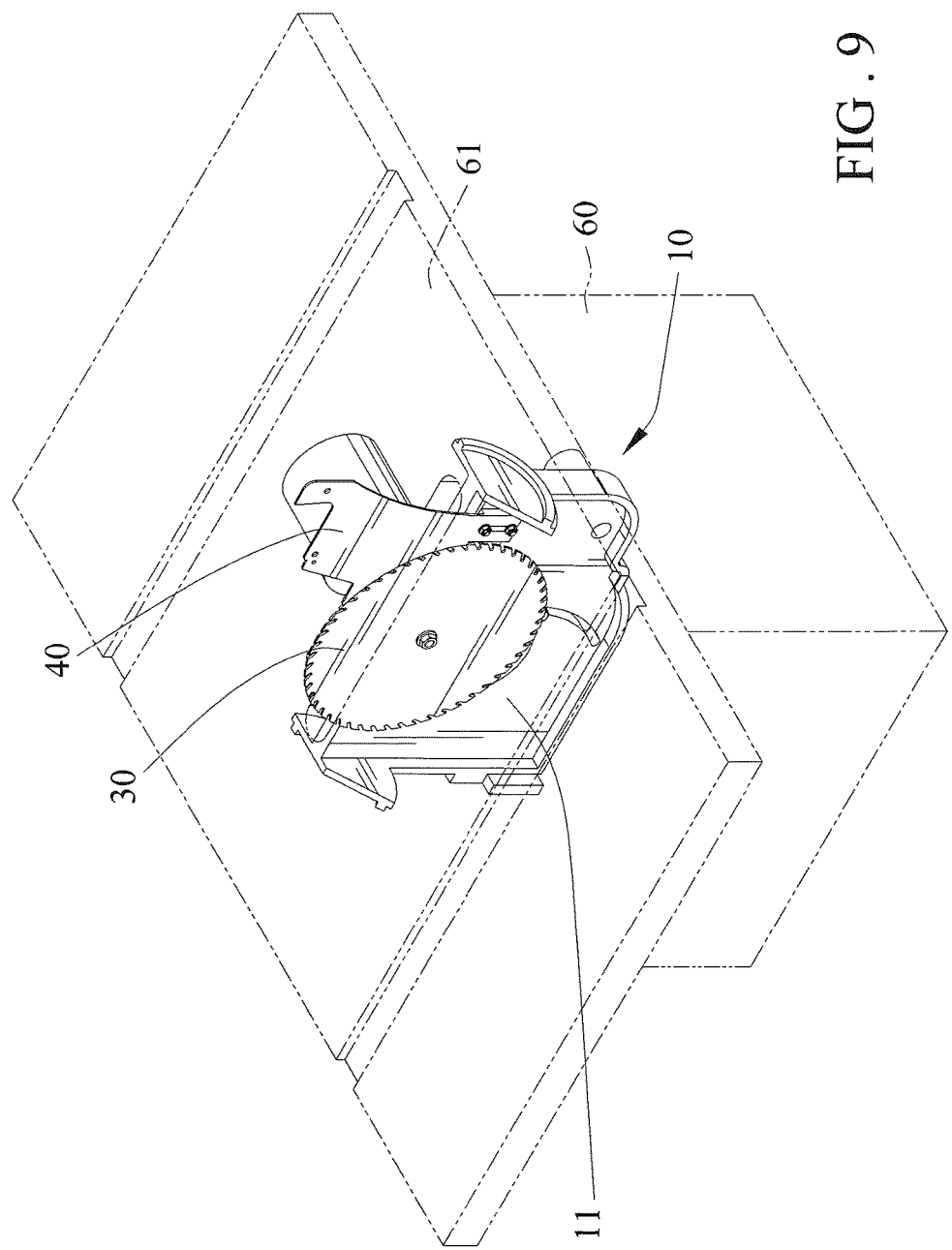
FIG. 9 is a perspective view of the apparatus shown in FIG. 1 installed to a saw grinding machine.

FIGS. 1 through 5 and 9 show an apparatus for fixing a saw blade 30 and a knife plate 40 of a saw grinding machine 60. The apparatus includes a driving device 10 and a fixture plate 20.

The driving device 10 includes a base member 11 coupled to the saw grinding machine 60 and having a lift/lower trough 111, a pivot 112 and an arcuate adjustment slot 113 or trough 113, an adjusting block 12 and a driving element 13. A pivotal portion 121 is provided at an end of the adjusting block 12 and pivotally connected to the pivot 112 of the base member 11 so that the adjusting block 12 is able to pivot with respect to the base member 11. An arcuate toothed portion 122 and a connective base 123 are provided at another end of the adjusting block 12 opposite to the pivotal portion 121. The toothed portion 122 is engaged with a bolt (not shown) to adjust the adjusting block 12 to pivot and the connective base 123 corresponds to the lift/lower trough 111. The driving element 13 includes an axial portion or drive shaft 131 inserted through and pivotally connected to the connective base 123.

The fixture plate 20 is pivotally connected to the connective base 123 and includes a connective hole 21, a coupled portion 22 and a guiding portion 23. In this case, the fixture plate 20 is preferably L-shaped. Hence, the coupled portion 22 and the guiding portion 23 are respectively provided at two ends of the fixture plate 20 and approximately perpendicular to each other, and the connective hole 21 is provided at a connection of the coupled portion 22 and the guiding portion 23.

The connective hole 21 is mounted on a side of the connective base 123 of the driving device 10. A mounted ring 211 is provided between the connective hole 21 and the connective base 123 to pivot the fixture plate 20 with respect to the connective base 123. A base disc 201 is provided to an exterior side of the connective hole 21 and engaged with the connective base 123 via numbers of fixture elements 202 for covering on the exterior side of the fixture plate 20 so that the fixture plate 20 is moved with the driving device 10 simultaneously.

A distance between the coupled portion 22 and the connective hole 21 is larger than a distance between the guiding portion 23 and the connective hole 21. Two projections 221 project from a side of the coupled portion 22 opposite to the driving device 10.

The guiding portion 23 is slideably disposed in the adjustment trough 113 of the base member 11 so that the adjustment trough 113 guides the connective hole 21 be positioned in the same horizontal position as the coupled portion 22. A through-hole 231 is defined at the guiding portion 23 and corresponds to the adjustment trough 113 of the base member 11. A limited element 232 is adapted to be inserted through the through-hole 231 and the adjustment trough 113 and connects the fixture plate 20 to the base member 11 for guiding the fixture plate 20 in position.

The saw blade 30 includes an axial hole 31 installed to the axial portion 131 of the driving device 10 so that the driving device 10 drives the saw blade 30 to process a cutting operation. The axial hole 31 of the saw blade 30 and the connective hole 21 of the fixture plate 20 are co-axial and the saw blade 30 and the fixture plate 20 are parallel to each other.

The knife plate 40 is fixed to the coupled portion 22 of the fixture plate 20 and includes a coupled portion 41 having a slot 411. The coupled portion 41 has a thickness to firmly engage the slot 41 with the two projections 221 of the coupled portion 22 of the fixture plate 20. The knife plate 40 is fixed to the fixture plate 20 via engagements of two engagement units 412 with the two projections 221. A blocked side 42 is formed on a side of the knife plate 40 and corresponds to the outer periphery of the saw blade 30. A vertical distance between one position on the blocked side 42 and the saw blade 30 would be maintained to be fixed by the knife plate 40 fixed to the coupled portion 22 of the fixture plate 20.

Referring to FIGS. 6 through 9, the adjusting block 12 can drive the fixture plate 20 and the saw blade 30 to move simultaneously to lift/lower the saw blade 30 with respect to the saw grinding machine 60. While the adjusting block 12 is pivoted in the lift/lower trough 111 of the base member 11, the guiding portion 23 guides the connective hole 21 and the coupled portion 22 of the fixture plate 20 to be maintained in the same horizontal position. The saw blade 30, adjusting block 12 and the fixture plate 20 move simultaneously with one another and the knife plate 40 is fixed to the coupled portion 22 of the fixture plate 20. The knife plate 40 moves simultaneously with the fixture plate 20. The vertical distance between the blocked side 42 and the saw blade 30 would be maintained to be fixed by fixing the knife plate 40 to the coupled portion 22 of the fixture plate 20.

The base member 11 is installed to the saw grinding machine 60 and the saw blade 30 is able to be lifted or lowered with respect to a platform 61 of the saw grinding machine 60. A vertical distance between the knife plate 40 and the saw blade 30 can be fixed. Therefore, the knife plate can split wood accurately.

Figure 10A:
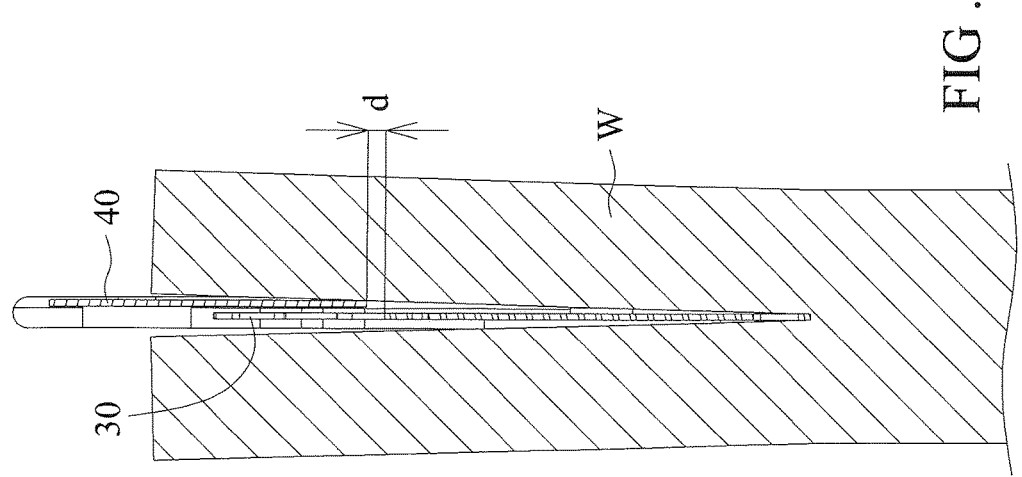
FIGS. 10a and 10b are cross-sectional views of the apparatus shown in FIG. 1, illustrating a wood plate being cut by the saw blade.
Figure 10B:
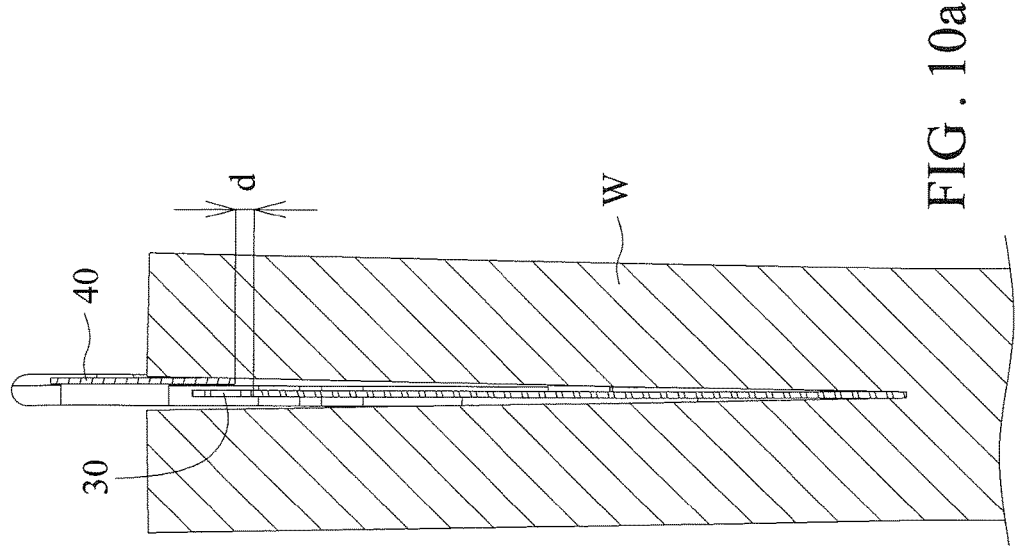

FIGS. 10a and 10b show a wood plate W cut by the saw blade 30. While the saw blade 30 moves to cut the wood plate W, the knife plate 40 is driven to move with respect to the saw blade 30. Thus, the cut wood plate W can be divided by the knife plate 40 easily. Further, because the knife plate 40 and the saw blade 30 are able to move simultaneously in use, a vertical distance d between the knife plate 40 and the saw blade 30 would be fixed, no matter which position the saw blade 30 moves to.

While several embodiments of the invention have been shown and described, it will be apparent to those skilled in the art that modifications may be made therein without departing from the scope and spirit of the present invention.

What is claimed is:

1. A saw comprising:
   a driving device including a base member, an adjusting block, and a driving element, with the base member coupled to a platform, with the base member including an adjustment slot, with the adjusting block including a pivotal portion pivotally connected to the base member, with the adjusting block further including a connective base disposed opposite to the pivotal portion, with the driving element including a drive shaft inserted through the connective base;
   a fixture plate having a first end and a second end, with the fixture plate including a connective hole coupled to the driving device, with the fixture plate including a coupled portion located at the first end thereof, with the connective hole connected to a side of the connective base, with a mounted ring provided in the connective hole, and with a base disc provided to an exterior side of the connective hole and engaged with the connective base via a plurality of fixture elements;
   a saw blade installed to the drive shaft of the driving element, with the driving element driving the saw blade to process a cutting operation, with the saw blade and the fixture plate moved with respect to the base member simultaneously; and
   a knife plate coupled to the coupled portion, with the knife plate including a blocked side formed on a side thereof, and with a vertical distance between the blocked side and the saw blade maintained to be fixed.

2. The saw as claimed in claim 1, with the base member including a lift/lower trough aligned with the connective base, and a pivot connected to the pivotal portion.

3. The saw as claimed in claim 1, with the adjusting block including an arcuate toothed portion provided at one end thereof opposite to the pivotal portion, with the toothed portion for adjusting the adjusting block to pivot the connective base relative to the lift/lower trough.

* * * * *